United States Patent
Kodalapura et al.

(10) Patent No.: US 10,318,440 B2
(45) Date of Patent: Jun. 11, 2019

(54) MAPPING SECURITY POLICY GROUP REGISTERS

(71) Applicant: INTEL CORPORATION, Santa Clara, CA (US)

(72) Inventors: Nagaraju N. Kodalapura, Hillsboro, OR (US); Vladimir Beker, Ariel (IL); Raghunandan Makaram, Northborough, MA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/274,793

(22) Filed: Sep. 23, 2016

(65) Prior Publication Data

US 2018/0091554 A1 Mar. 29, 2018

(51) Int. Cl.
*G06F 12/14* (2006.01)
*G06F 21/62* (2013.01)
*G06F 21/71* (2013.01)
*G11C 7/10* (2006.01)

(52) U.S. Cl.
CPC ...... *G06F 12/1491* (2013.01); *G06F 21/6281* (2013.01); *G06F 21/71* (2013.01); *G06F 2212/1052* (2013.01); *G06F 2221/032* (2013.01); *G11C 7/1072* (2013.01)

(58) Field of Classification Search
CPC .............................. G06F 12/1491; G06F 21/71
USPC ......................................................... 711/105
See application file for complete search history.

(56) References Cited

U.S. PATENT DOCUMENTS

| 8,244,841 | B2 | 8/2012 | Shaji et al. |
| 2007/0266214 | A1* | 11/2007 | Ohyama ............. G06F 12/1441 711/163 |
| 2008/0046762 | A1* | 2/2008 | Kershaw ................. G06F 21/74 713/193 |
| 2001/0298408 | | 10/2014 | Sastry et al. |
| 2014/0298408 | A1 | 10/2014 | Sastry et al. |
| 2016/0085969 | A1 | 3/2016 | Wiseman |
| 2016/0117240 | A1 | 4/2016 | Dinkjian et al. |
| 2016/0156632 | A1 | 6/2016 | Rohleder et al. |

OTHER PUBLICATIONS

International Search Report and Written Opinion dated Dec. 5, 2017, on application No. PCT/US2017/048949.

* cited by examiner

*Primary Examiner* — Jae U Yu
(74) *Attorney, Agent, or Firm* — Lowenstein Sandler LLP

(57) ABSTRACT

An example method for remapping a group of system registers. The method may include receiving, by a secure access control mechanism, a request to remap one of a group of system registers from an association with a first access policy group to an association with a second access policy group. The method may include storing the remapping array at a memory of the secure access control mechanism, where a first value stored in a first entry of the remapping array maps the one of the group of system registers to the second access policy group. The method may include remapping, by the secure access control mechanism, the one of a group of system registers from the association with the first access policy group to the association with the second access policy group using the remapping array.

18 Claims, 12 Drawing Sheets

MAPPING SECURITY POLICY GROUP REGISTERS

BACKGROUND

As computer systems are becoming more complex, hardware components in the computing systems are connected together to enable communication between the hardware components. The hardware components may be devices in the computer system that initiates transactions in the computer system. The hardware components may include central processing units (CPU), memory controllers, memory hubs, input/output (I/O) hubs, and so forth, that are connected via buses, interconnects, or substrates. Security software, firmware, and hardware may be employed in the computer system to manage the access of the hardware components in the computer system to assets and resources in the computer system, such as memories and registers at the hardware components.

BRIEF DESCRIPTION OF THE DRAWINGS

Various embodiments of the present invention will be understood more fully from the detailed description given below and from the accompanying drawings of various embodiments of the invention.

DESCRIPTION OF EMBODIMENTS

Figure 1:
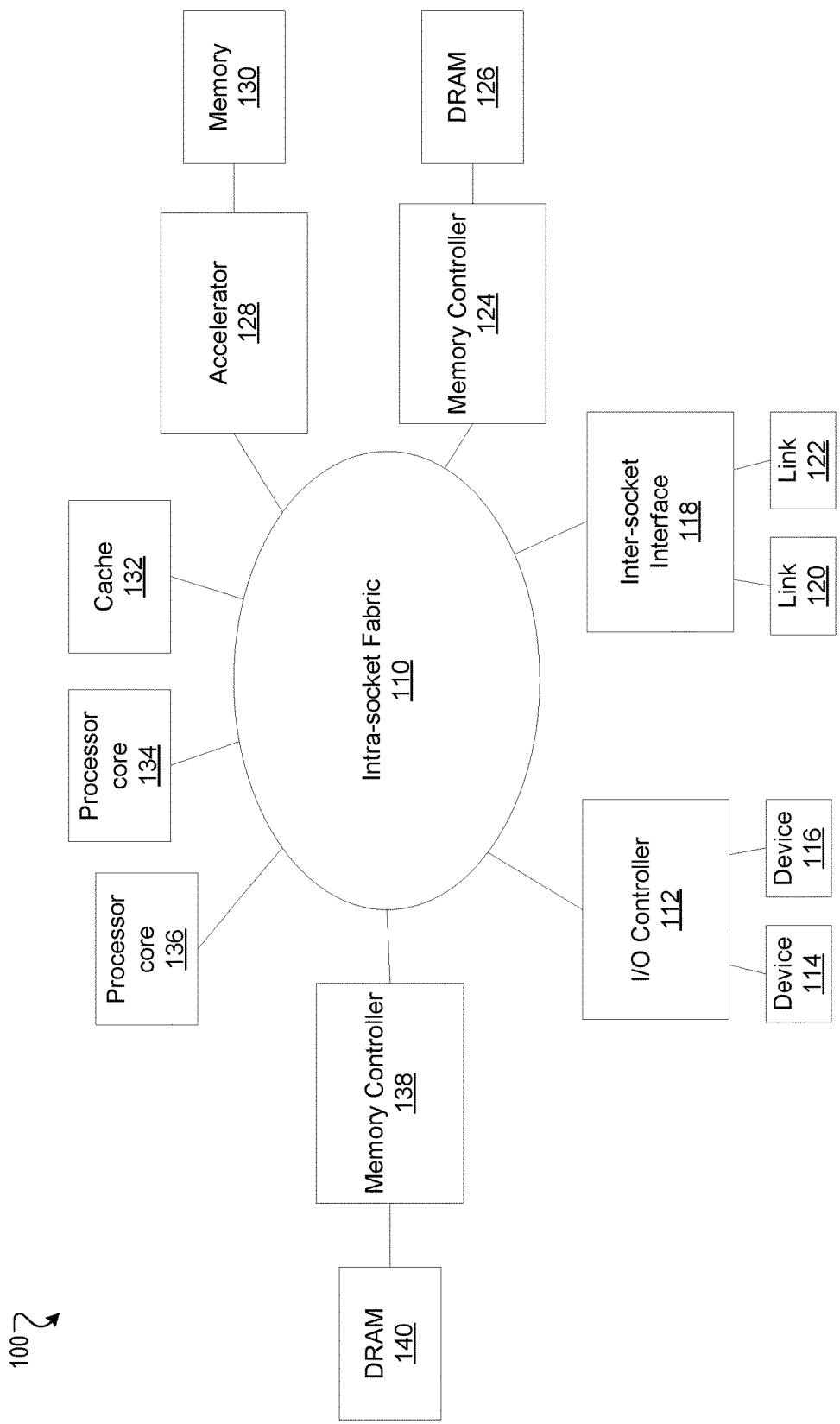
FIG. 1 illustrates a computer system with hardware components coupled to an intra-socket fabric according to one embodiment.

Security issues in computer systems are an increasing problem. Viruses, Trojan horse programs, malware, and ransomware are often addressed via the use of security software, such as antivirus, antispyware, and firewall software. Many security attacks are targeted at a software level of the computer systems and are designed to access various operating systems or file resources. For example, a virus may gain access to files in a computer system via a download of an executable program containing hidden code. To prevent this type of attack, antivirus software may be used to scan downloaded files looking for known or suspicious code.

Security attacks may also be made at the hardware level. The security attacks may attack discrete components such as central processing units (CPUs), memory controllers or hubs, input/output (I/O) hubs, and interconnect structures. The interconnect structures can include buses, interconnects, memory fabrics, or intra-connect fabrics.

Security policies may be executed by security software in the computing system to prevent unsecured access to hardware resources and assets in the computing system. For example, security attributes of initiators (SAIs) are defined to represent the properties of an hardware component in the computer system. The SAIs are used for making access decisions for hardware components and other resources in the computer system. The SAIs are generated by hardware entities and accompany each transaction initiated by a corresponding hardware component. Policy registers are employed for defining the policies for read and write access to an hardware component or resource and for restricting the trusted agents or uCode programs that can configure or update these policies. The policy registers can include control policy (CP) registers, write access control (WAC) registers, and read access control (RAC) registers.

The CP registers store entries indicating the hardware components that may access or modify the CP registers, the WAC registers, or the RAC registers. The WAC registers store entries indicating the hardware components belonging to access policy groups that may write to the registers in a computer system. The registers in the computer system may be integrated into hardware components or coupled to the hardware components. The RAC registers store entries indicating the hardware components belonging to access policy groups that may read from the registers in a computer system. An access policy group may be one or more hardware components in a group with the same permission levels. In one example, the one or more hardware components associated with an access policy group may be the same type of hardware components, e.g., processor cores, memory controllers, and so forth. In another example, the one or more hardware components associated with an access policy group may be hardware components defined within the computer system to have the same type of access levels, such as an operating system (OS) access level, a microcode or up code access level, and so forth.

Conventionally, an association between an access policy group and a hardware component is hard coded and static. However, an access policy group associated with a hardware component may be incorrect or need to be changed. For example, an error in register definition language (RDL) or a software bug may initially associate a hardware component with a wrong access policy group. Associating the hardware component with the wrong access policy group may cause the hardware component to be denied access to data in a register that the hardware component needs to access. Associating the hardware component with the wrong access policy group may also grant the hardware component access to data that should be restricted from being accessed by the hardware component. Additionally, when attributes of an access policy group change, an hardware component in the access policy group may need to be changed to a different access policy group to maintain a proper access level of the hardware component. The hard coded association between the access policy groups and the registers can restrict the computing system from changing access policy group associations that need to be changed to provide hardware components with proper access to registers or memory regions in the computer system.

The embodiments described herein may address the above-noted deficiencies by providing a mechanism or device to change the access policy groups that are associated with the hardware components. In one embodiment, the secure access control mechanism can store a mapping array to remap an hardware component from being mapped to a first access policy group to being mapped to a second access policy group. In another embodiment, the secure access control mechanism or a processor may change a value in a bit field of a register of an hardware component from a first value indicating an association of the hardware component with a first access policy group to a second value indicating an association of the register with a second access policy group.

FIG. 1 illustrates a computer system 100 with hardware components 112-140 coupled to an intra-socket fabric 110 according to one embodiment. In one example, an hardware component may be a component in the computer system 100 that initiates resource access requests to access memory, registers, system registers, or other resources of the other hardware components in the computer system 100. In another example, the hardware component may be a component in the computer system 100 that receives a resource access request from another hardware component for the other hardware component to access memory, registers, system registers, or other resources of the hardware component. The hardware components 112-140 can include an input/output (I/O) controller 112, devices 114 and 116, an inter-socket interface 118, links 120 and 122, memory controllers 124 and 138, dynamic random-access memories (DRAMs) 126 and 140, an accelerator 128, a memory 130, a cache 132, and processor cores 134 and 136. The devices 114 and 116 may be peripheral devices such as computer mice, printers, keyboards, external hard drives, external graphical processing units (GPUs), and so forth. The links 120 and 122 may be network interface cards (NICs), bridges, network switches, and so forth. In one embodiment, the input/output (I/O) controller 112, the inter-socket interface 118, the memory controllers 124 and 138, an accelerator 128, a memory 130, the cache 132, and processor cores 134 and 136 may be coupled to the intra-socket fabric 110. The devices 114 and 116 may be coupled to the I/O controller 112, the links 120 and 122 may be coupled to the inter-socket interface 118, the DRAM 126 may be coupled to the memory controller 124, the memory 130 may be coupled to the accelerator 128, and the DRAM 140 may be coupled to the memory controller 138.

The intra-socket fabric 110 is an interface that interconnects the hardware components 112-140 together to provide resource access between the hardware components 112-140. The hardware components 112-140 may interact with each other to offload processing workloads and share data. Interactions between the hardware components 112-140 may be facilitated by accessing memory, storage resources, or registers associated with the hardware components 112-140. In one example, the processor core 136 may access the I/O controller 112, the devices 114 and 116, the inter-socket interface 118, the links 120 and 122, the memory controllers 124 and 138, the DRAMs 126 and 140, the accelerator 128, the memory 130, the cache 132, or the processor core 134. In another example, the intra-socket fabric 110 may interconnect the I/O controller 112 with the memory controller 124. When interconnected via the intra-socket fabric 110, the device 114 coupled to the I/O controller 112 may access data stored in the DRAM 126 that is coupled to the memory controller 124.

The computer system 100 may be a system on a chip (SoC). In one example, the processor cores 134 and 136 and the accelerator 128 may include internal components that are integrated into the SoC. In another example devices 114 and 116, may be internal or external to the SoC. Also, software and firmware entities may be external to the computer system 100 and may attempt to access internal or external resources of the computer system 100 through the links 120 and 122.

The intra-socket fabric 110 and the hardware components 112-140 includes data and hardware assets, such as control policy (CP) registers, write access control (WAC) registers, and read access control (RAC) registers that protect against unauthorized access to resources in the computer system 100. The resources in the computer system 100 can include the hardware components 112-140, registers of the hardware components 112-140, the intra-socket fabric 110, and so forth. The hardware components 112-140 or the intra-socket fabric 110 may include secure access control mechanisms to define access control to the hardware components 112-140.

Figure 2:
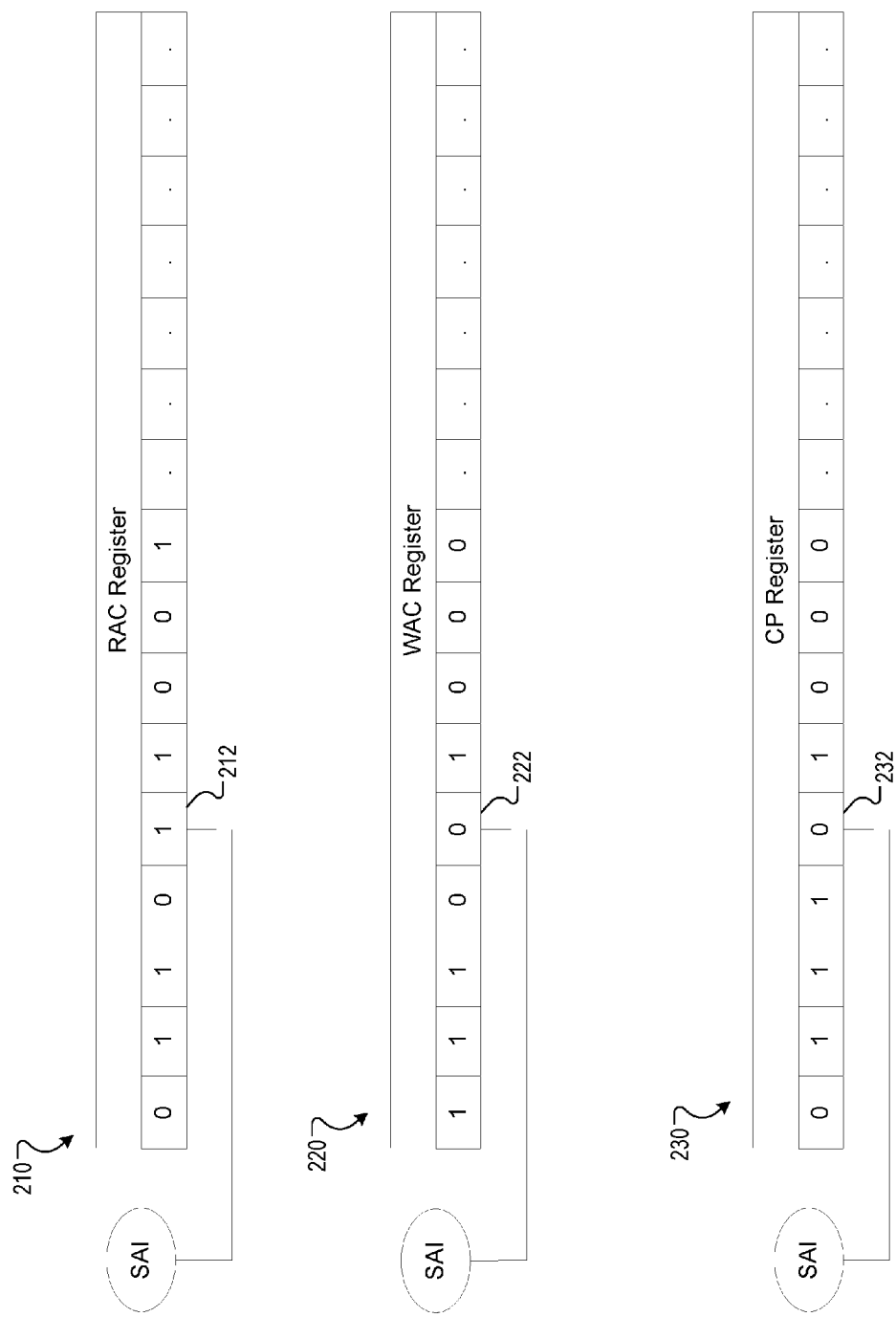
FIG. 2 illustrates an RAC register, a WAC register, and a CP register according to one embodiment.

FIG. 2 illustrates an RAC register 210, a WAC register 220, and a CP register 230 according to one embodiment. The RAC register 210, the WAC register 220, and the CP register 230 may be set of control registers stored at the intra-socket fabric 110 or one or more of the hardware components 112-140 in FIG. 1.

The RAC register 210 stores bits indicating read permissions for hardware components in different access policy groups. The WAC register 220 stores bits indicating write permissions defined for hardware components in the some access policy groups. The CP register 230 stores bits indicating initiators that may change values that may change values stored in entries in the RAC register 210, the WAC register 220, or the CP register 230.

When a first hardware component requests read access to a register of a second hardware component, the request can include a first SAI. The first SAI for the request may be matched with a second SAI stored at a processing device or as secure access control mechanism. The match can indicate that the first hardware component is part of the first access policy group. The second SAI can indicate a read permission level of the first access policy group is at entry 212 of the RAC register 210, the write permission level of the first access policy group is at entry 222 of the WAC register 220, and the control policy permission level of the first access policy group is at entry 232 of the CP register 230.

In one embodiment, a 1 bit in the entry 212, 222, or 232 indicates the hardware components in the first policy group (including the first hardware component) may access any of the registers in the computer system 100 in FIG. 1 and a 0 bit indicates the hardware components in the first policy group (including the first hardware component) may not access any of the registers in the computer system 100 in FIG. 1. In another embodiment, the bits in the entry 212, 222, or 232 may indicate different permissions level for hardware components in the first access policy groups to access registers of other hardware components in the computer system 100. For example, the bits in entry 212 may be 101, indicating that the registers hardware components in the first access policy group may be read by hardware components in a second policy group, may not read by hardware components in a third policy group, and may read by hardware components in a fourth policy group.

Figure 3:
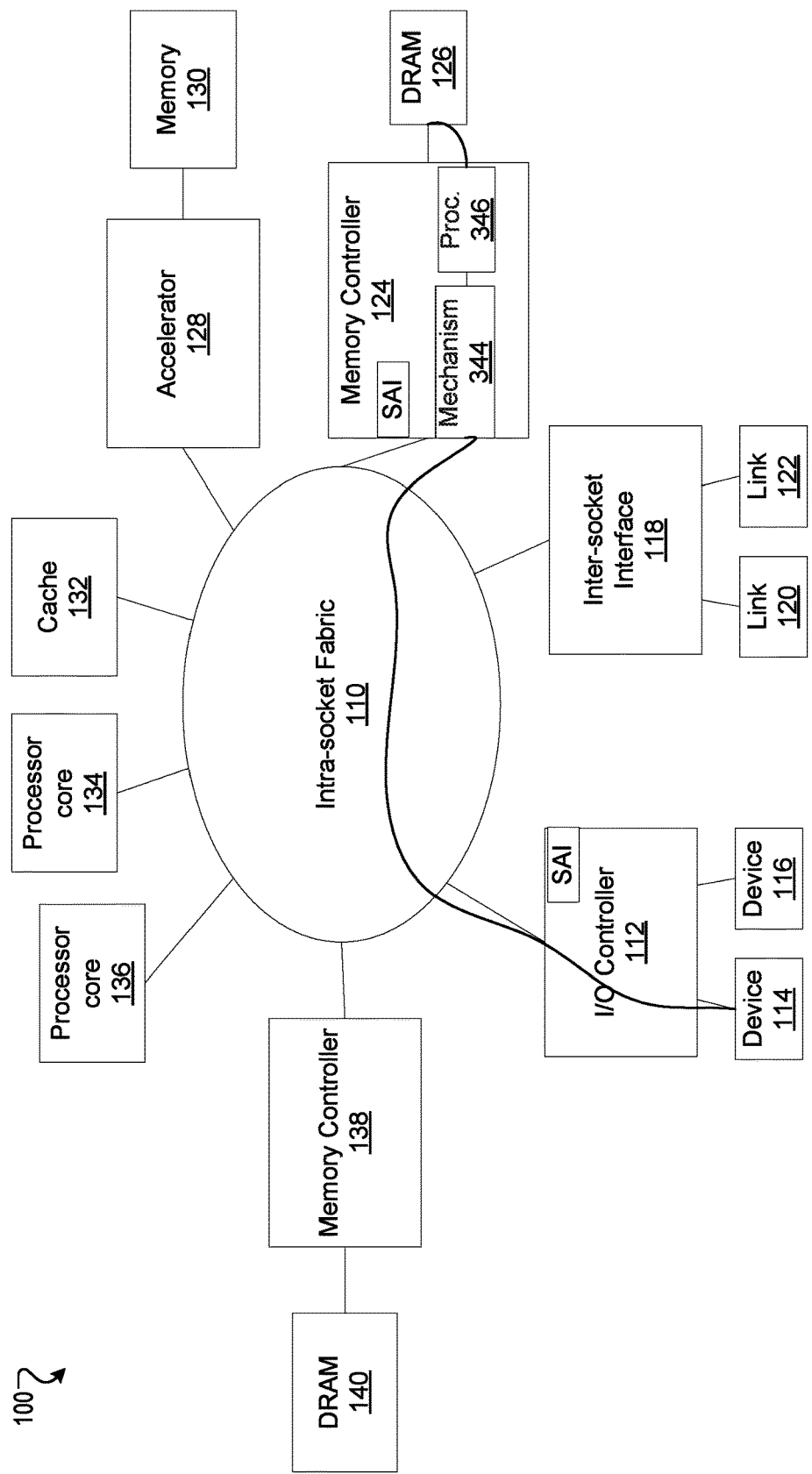
FIG. 3 illustrates an access path of a device to access a dynamic random access memory (DRAM) according to one embodiment.

FIG. 3 illustrates an access path 350 of a device 114 to access DRAM 126 according to one embodiment. Some of the features in FIG. 3 are the same or similar to the some of the features in FIG. 1 as noted by same reference numbers, unless expressly described otherwise. The device 114 may initiate a transaction, such as a read request or a write request, to access the DRAM 126 and send the transaction request to the I/O controller 112. In response to the transaction request from the device 114, the I/O controller 112 may generate a SAI and append the SAI to the transaction request from the device 114. The I/O controller 112 may send, via the intra-socket fabric 110, the transaction request to a secure access control mechanism 344 at the memory controller 124. A processing device 346 may be coupled to the secure access control mechanism 344.

The memory controller 124 may include control registers. The control registers may include the RAC register 210, the WAC register 220, and the CP register 230 to indicate policy groups of hardware components that can access the DRAM 126. The number or type of control registers is not intended to be limiting. For example, the control RAC register 210 and the WAC register 220 may be combined into a single register. The secure access control mechanism 344 or the processing device 346 may determine a policy group that the device 114 is associated with and permissions level of hardware components in the policy group to access the DRAM 126, as discussed in greater detail below.

The secure access control mechanism 344 or the processing device 346 may determine the permission level of the device 114 to read or write to the DRAM 126 by matching the SAI from the I/O controller 112 with a SAI stored in a register of the memory controller 124. For example, the SAI may be a sequence of bits that identifies the hardware component requesting a transaction. In one embodiment, the sequence of bits used for matching may be unique to an access policy group or a hardware component. For example, a first hardware component may have unique SAI with a bit value of 0x10 and a second hardware component may have a unique SAI with a bit value of 0x11. In another embodiment, the sequence of bits may have a level of differentiation needed for security purposes. In one example, one or more hardware components may have more than one SAI to distinguish security level for different processor cores. In another example, multiple hardware components may have the same SAI, such as externally connected devices may have the same SAI indicating the hardware components are untrusted devices in the computing system.

The SAI stored in a register of the memory controller 124 may be associated with an access policy group. The access policy group may be associated with access policy group information that indicates a permissions level of one or more hardware components, including the device 114, to access the DRAM 126. When the read or write permissions level of the policy group indicate that the hardware components in the policy group, may access the DRAM 126, and the memory controller 124 can read the data from the DRAM 126 and send it to the device 114 or write the data to the DRAM 126.

The memory controller 124 including the secure access control mechanism 344 and the processing device 346 is not intended to be limiting. The hardware components 112-140 in the computer system 100 can include secure access control mechanisms and processing devices use SAIs to enforce access control on transactions generated by other hardware components 112-140 in the computer system 100. The number of SAIs associated with the hardware component 112-140 is also not intended to be limiting. In one example, one SAI may be assigned to each hardware component or multiple SAIs may be assigned to each hardware component. In another example, a SAI may be assigned to multiple hardware components.

Figure 4A:
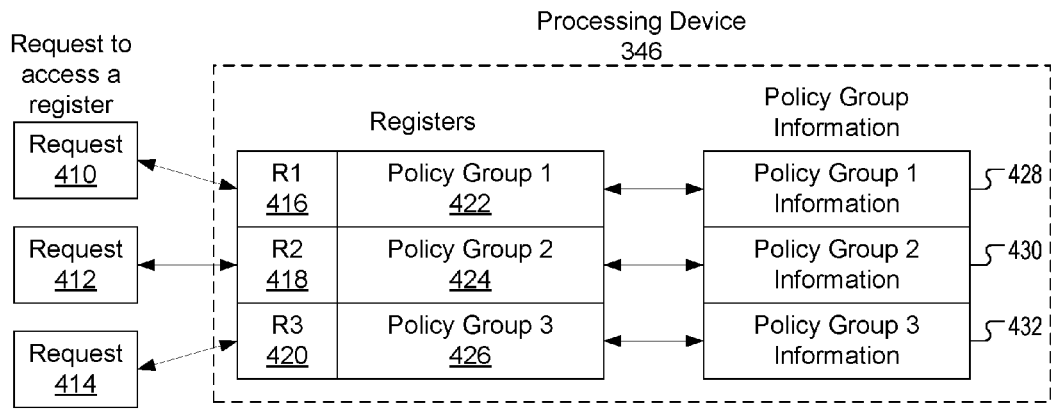
FIG. 4A illustrates a mapping of policy groups to policy group information according to one embodiment.

FIG. 4A illustrates a mapping of policy groups 422-426 to policy group information 428-432 according to one embodiment. Some of the features in FIG. 4A are the same or similar to the some of the features in FIG. 3 as noted by same reference numbers, unless expressly described otherwise. The processing device 346 can include registers 416, 418, and 420. The register 416 can store a first value representative of a policy group 1 (422). The register 416 may also store SAI information associated with the policy group 1 (422) that may match SAI information of a transaction request, as discussed above. The policy group 1 (422) is associated with policy group 1 information 428. The policy group 1 information 428 may be data stored in a memory device or a register that indicates a permissions level of hardware components in the access policy group 1 (422) to access another hardware component.

The register 418 can store a second value representative of a policy group 2 (424) associated with the register 418. The register 418 may also store SAI information associated with the policy group 2 (424) that may match SAI information of a transaction request. The policy group 2 (424) is associated with policy group 2 information 430. The policy group 2 information 430 may be data stored in a memory device or a register that indicates a permissions level of hardware components in the access policy group 2 (424) to access another hardware component.

The register 420 can store a third value representative of a policy group 3 (426) associated with the register 420. The register 420 may also store SAI information associated with the policy group 3 (426) and that that may be matched with SAI information of a transaction request. The policy group 3 (426) is associated with policy group 3 information 432. The policy group 3 information 432 may be data stored in a memory device or a register that indicates a permissions level of hardware components in the access policy group 3 (426) to access another hardware component.

The processing device 346 may use the policy group information 428-432 to determine whether a transaction request to access the other hardware component. For example, the processing device 346 at a first hardware component may receive transaction requests 410, 412, and 414 from a second hardware component, a third hardware component, and a fourth hardware component, respectively, to access a register at the first hardware component.

In one embodiment, the second hardware component may send the transaction request 410 to the processing device 346. The transaction request 410 may include a first SAI that the processing device 346 matches to SAI information of the first policy group 1 (422). The processing device 346 may identify policy group 1 information 428 that correlates to policy group 1 (422). The policy group information may indicate the permission level of the second hardware component to access the register at the first hardware component. When the policy group information 428 indicates that the second hardware component may access the register, the second hardware component may perform the transaction request 410, such as reading data from the register or writing data to the register. When the policy group information 428 indicates that the second hardware component may not access the register, the second hardware component may not perform the transaction request 410.

The third hardware component can send the transaction request 412 to the processing device 346. The processing device 346 may determine that the third hardware component is associated with policy group 3 (424) and may determine whether the policy group 3 information 430 indicates that the third hardware component has permission to access the register. The fourth hardware component can send the transaction request 414 to the processing device 346. The processing device 346 may determine that the fourth hardware component is associated with policy group 426 and may determine whether the policy group information 432 indicates that the fourth hardware component has permission to access the register.

Figure 4B:
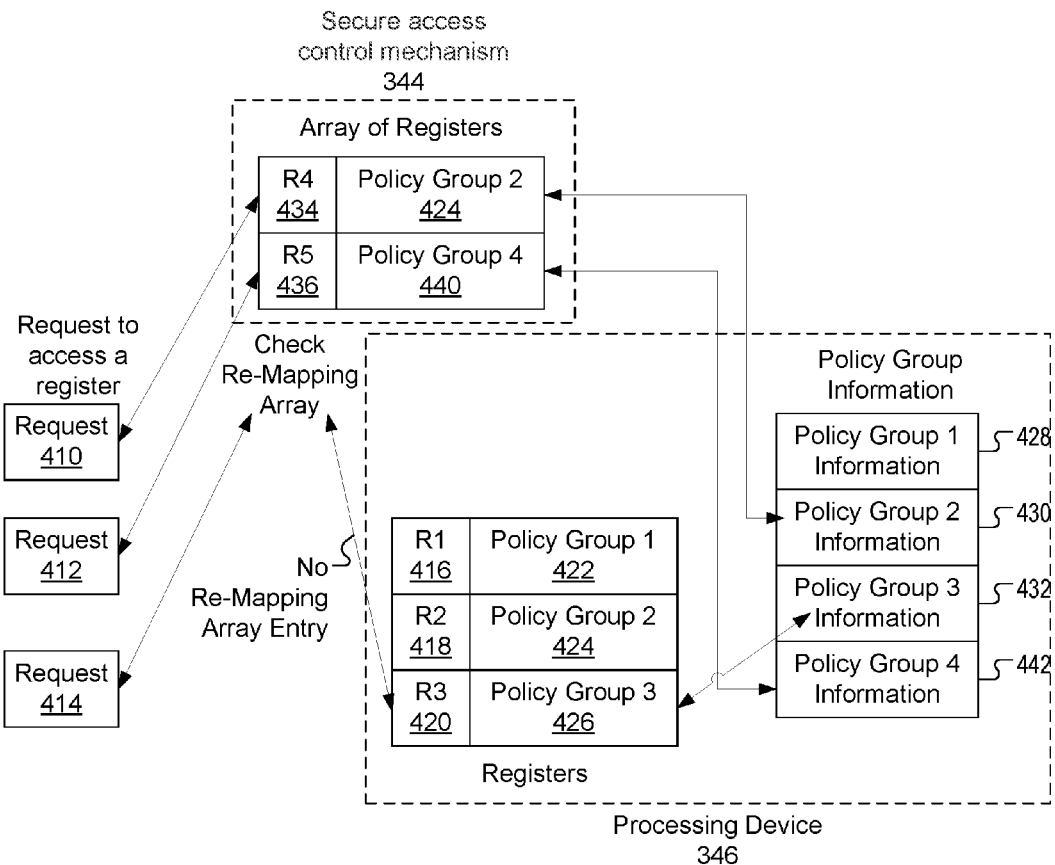
FIG. 4B illustrates a secure access control mechanism with an array of registers to change the policy groups associated with the security attributes of initiators (SAIs) associated with the second hardware component and the third hardware component according to one embodiment

FIG. 4B illustrates a secure access control mechanism 344 with an array of registers 434 and 436 to change the policy groups associated with the SAIs associated with the second hardware component and the third hardware component according to one embodiment. Some of the features in FIG. 4B are the same or similar to the some of the features in FIGS. 3 and 4A as noted by same reference numbers, unless expressly described otherwise.

The secure access control mechanism 344 may provide secure access control to a register or a group of registers at the first hardware component in view of a programmable security policy group enforced by a set of control registers comprising: a CP register, a WAC register, and an RAC register. The secure access control mechanism 344 may include an array of registers, such as universal control registers (UCRs). Thus array of UCRs can include a first register storing the first entry 434 and a second register storing the second entry 436.

A first entry 434 stored in a first register of the array of registers may store bits that represent the policy group 2 (424). The secure access control mechanism 344 may use the first entry to remap the policy group associated with the second hardware component from the policy group 1 (422) to the policy group 2 (424). To remap the policy group associated with the second hardware component from the policy group 1 (422) to the policy group 2 (424), the secure access control mechanism 344 may store SAI information in the entry 434 that matches the SAI information in the first transaction request 410. The SAI information in the entry 416 may be associated with the policy group 2 (424) and the policy group 2 (424) may be associated with the policy group 2 information (430).

A second entry 436 stored in a second register of the array of may store bits that represent the policy group 4 (440). The secure access control mechanism 344 may use the second entry to remap the policy group associated with the third hardware component from the policy group 2 (424) to a policy group 4 (440). To remap the policy group associated with the third hardware component from the policy group 2 (424) to the policy group 4 (440), the secure access control mechanism 344 may store SAI information in the entry 436 that matches the SAI information in the second transaction request 412. The SAI information in the entry 436 may be associated with the policy group 4 (440) and the policy group 4 (440) may be associated with the policy group 4 information (442).

An hardware component may use secure access control mechanism 344 to determine whether a transaction request to access the hardware component permitted. For example, the secure access control mechanism 436 may receive a request to remap the SAI information for the second hardware component from an association with the access policy group 1 (422) to an association with the access policy group 2 (424) and remap the SAI information for the third hardware component from an association with the access policy group 2 (424) to an association with an access policy group 4 (440). The request includes a remapping array register 434 to remap the SAI information for the second hardware component and the third hardware component. A first set of bits stored in a first entry 434 of the remapping array maps the SAI information for the second hardware component to the access policy group 2 (424). A second set of bits stored in a second entry 436 of the remapping array maps the SAI information for the third hardware component to the access policy group 4 (440). The secure access control mechanism 436 may store the remapping array at a memory of the secure access control mechanism 436. The access policy group information 428, 430, 432, and 442 may include permission level of hardware components with different access levels, such as operating system (OS) access levels, microcode or up code access levels, or reserved access levels. The remapping of the policy groups associated with hardware components may be performed after the hardware components have been integrated into a computer system.

The first hardware component may receive the transaction requests 410, 412, and 414 from the second hardware component, the third hardware component, and the fourth hardware component in the computer system. The first hardware component may use the secure access control mechanism 436 and the processing device 326 to determine a permission level of the second hardware component, the third hardware component, and the fourth hardware component to perform the transactions request 410-414, respectively. For example, the second hardware component may send the transaction request 410 to first hardware component. The first hardware component may send the transaction request 410 to the secure access control mechanism 436. The transaction request 410 may include a first SAI. The secure access control mechanism 436 may query registers 434 and 436 to determine whether the policy group 2 (424) or the policy group 4 (440) includes SAI information that matches the first SAI for the second hardware component. The secure access control mechanism 436 may determine that the SAI information in the policy group 2 (424) matches the first SAI for the second hardware component. The secure access control mechanism 436 can then determine whether the policy group 2 information (430) indicates that the second hardware component has permission to perform the requested transaction 410. When the policy group 2 information (430) indicates that the second hardware component has permission to perform the requested transaction 410, the second hardware component may perform the requested transaction 410. When the policy group 2 information (430) indicates that the second hardware component does not have permission to perform the requested transaction 410, the second hardware component may not perform the requested transaction 410. When the second hardware component does not have permission to perform the requested transaction 410, the first hardware component may send a message to the second hardware component denying the request.

The third hardware component may send the transaction request 412 to first hardware component. The first hardware component may send the transaction request 412 to the secure access control mechanism 436. The transaction request 412 may include a second SAI. The secure access control mechanism 436 may query registers 434 and 436 to determine whether the policy group 2 (424) or the policy group 4 (440) includes SAI information that matches the first SAI. The secure access control mechanism 436 may determine that the SAI information in the policy group 4 (440) matches the second SAI. The secure access control mechanism 436 can then determine whether the policy group 4 information (442) indicates that the third hardware component has permission to perform the requested transaction 410. When the policy group 4 information (442) indicates that the third hardware component has permission to perform the requested transaction 412, the third hardware component may perform the requested transaction 412. When the policy group 4 information (442) indicates that the third hardware component does not have permission to perform the requested transaction 412, the third hardware component may not perform the requested transaction 412.

The fourth hardware component may send the transaction request 414 to first hardware component. The first hardware component may send the transaction request 414 to the secure access control mechanism 436. The transaction request 412 may include a third SAI. The secure access control mechanism 436 may query registers 434 and 436 to determine whether the policy group 2 (424) or the policy group 4 (440) includes SAI information that matches the third SAI. The secure access control mechanism 436 may determine that neither the SAI information in the policy group 2 (424) or the policy group 4 (440) matches the third SAI. When the third SAI does not match the policy group 2 (424) or the policy group 4 (440), the secure access control mechanism 436 can forward the request to the processing device 346. The processing device 346 may determine that the policy group 3 (426) at register 420 includes SAI information that matches the third SAI. The processing device 346 may then determine whether the policy group 3 information (432) indicates that the fourth hardware component has permission to perform the requested transaction 414. When the policy group 3 information (432) indicates that the fourth hardware component has permission to perform the requested transaction 414, the fourth hardware component may perform the requested transaction 414. When the policy group 3 information (432) indicates that the fourth hardware component does not have permission to perform the requested transaction 414, the third hardware component may not perform the requested transaction 414.

Figure 5:
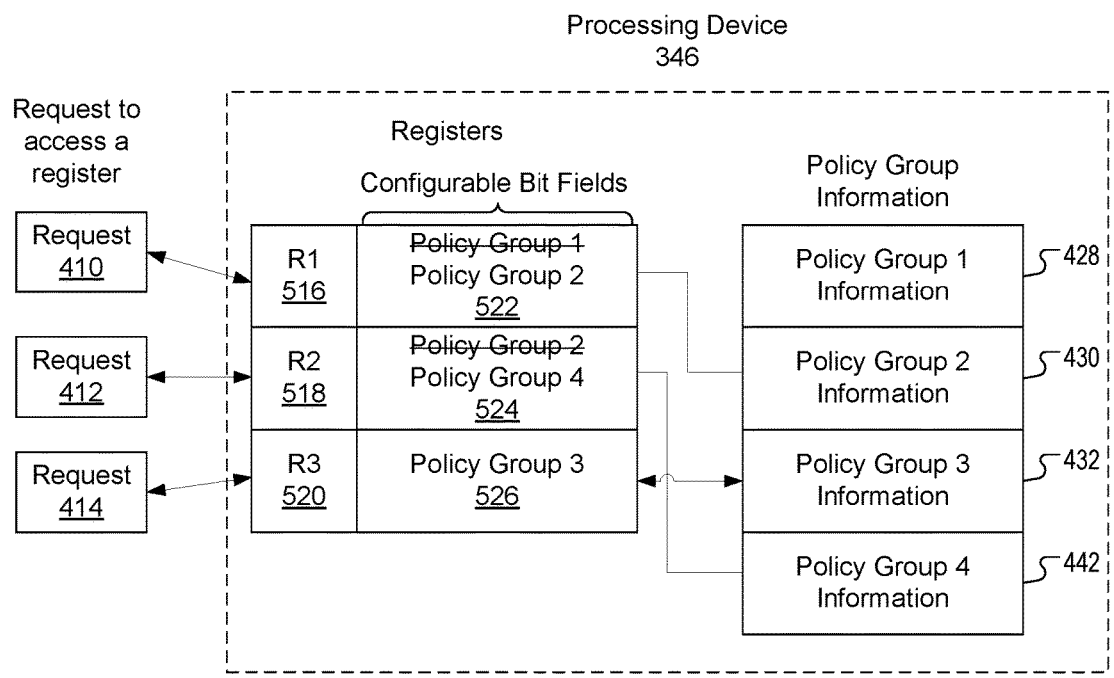
FIG. 5 illustrates a mapping of policy groups to policy group information according to one embodiment.

FIG. 5 illustrates a mapping of policy groups 522-526 to policy group information 428-432 according to one embodiment. Some of the features in FIG. 5 are the same or similar to the some of the features in FIGS. 3, 4A, and 4B as noted by same reference numbers, unless expressly described otherwise. The processing device 346 can include registers 516, 518, and 520 with configurable bit fields. The register 516 can store a value representative of a policy group 1 (522) associated with the register 516. The register 516 may also store SAI information associated with the policy group 1 (522) that may be matched with SAI information of a transaction request 410, as discussed above. The policy group 1 (522) is associated with policy group 1 information 428. The policy group 1 information 428 may be data stored in a memory device or register that indicates a permissions level of hardware components in the access policy group 1 (522) to access an hardware component that the processing device is integrated into or coupled to or another device coupled to the hardware component that the processing device is integrated into or coupled to.

The register 518 can store a value representative of a policy group 2 (524) associated with the register 518. The register 518 may also store SAI information associated with the policy group 2 (524) and that that may be matched with SAI information of a transaction request, as discussed above. The policy group 2 (524) is associated with policy group 2 information 430. The policy group 2 information 430 may be data stored in a memory device or register that indicates a permissions level of hardware components in the access policy group 2 (524) to access an hardware component that the processing device is integrated into or coupled to or another device coupled to the hardware component that the processing device is integrated into or coupled to.

The register 520 can store a value representative of a policy group 3 (526) associated with the register 520. The register 520 may also store SAI information associated with the policy group 3 (526) and that that may be matched with SAI information of a transaction request, as discussed above. The policy group 3 (526) is associated with policy group 3 information 432. The policy group 3 information 432 may be data stored in a memory device or register that indicates a permissions level of hardware components in the access policy group 3 (526) to access an hardware component that the processing device is integrated into or coupled to or another device coupled to the hardware component that the processing device is integrated into or coupled to.

An hardware component may use the processing device 346 to determine whether a transaction request to access the hardware component is permitted. For example, the processing device 346 may receive a request to change the SAI information for the second hardware component from an association with the access policy group 1 to an association with the access policy group 2 (522) and change the SAI information for the third hardware component from an association with the access policy group 2 to an association with an access policy group 4 (524). To change the SAI information for the second hardware component, the processing device can reconfigure one or more of the bits in the bit field of register 516 to change the bits representing the policy group from policy group 1 to policy group 2. To change the SAI information for the third hardware component, the processing device can reconfigure one or more of the bits in the bit field of register 518 to change the bits representing the policy group from policy group 2 to policy group 4.

The processing device 346 may use the policy group information 428-432 to determine whether a transaction request to access the hardware component that the processing device is integrated into or coupled to or another device coupled to the hardware component that the processing device is integrated into or coupled to. For example, the processing device 346, located at a first hardware component, may receive transaction requests 410, 412, and 414 from the second hardware component, the third hardware component, and the fourth hardware component, respectively, to access a register at the first hardware component.

The second hardware component may send the transaction request 410 to the processing device 346. The transaction request 410 may include a first SAI that the processing device 346 matches to SAI information of the policy group 2 (522). The processing device 346 may identify policy group 2 information 430 that correlates to policy group 2 (522). The policy group information may indicate the permission level of the second hardware component to access the register at the first hardware component. When the policy group 2 information 430 indicates that the second hardware component may access the register, the second hardware component may perform the transaction request 410, such as reading data from the register or writing data to the register. When the policy group 2 information 430 indicates that the second hardware component may not access the register, the second hardware component may not perform the transaction request 410.

The third hardware component may send the transaction request 412 to the processing device 346. The transaction request 412 may include a second SAI that the processing device 346 matches to SAI information of the policy group 4 (524). The processing device 346 may identify policy group 4 information 442 that correlates to policy group 4 (524). The policy group information may indicate the permission level of the third hardware component to access the register at the first hardware component. When the policy group 4 information 442 indicates that the third hardware component may access the register, the third hardware component may perform the transaction request 412, such as reading data from the register or writing data to the register. When the policy group 4 information 442 indicates that the third hardware component may not access the register, the second hardware component may not perform the transaction request 412.

The fourth hardware component may send the transaction request 414 to the processing device 346. The transaction request 414 may include a third SAI that the processing device 346 matches to SAI information of the policy group 3 (526). The processing device 346 may identify policy group 3 information 432 that correlates to policy group 3 (526). The policy group 3 information 432 may indicate the permission level of the fourth hardware component to access the register at the first hardware component. When the policy group 3 information 432 indicates that the fourth hardware component may access the register, the fourth hardware component may perform the transaction request 414, such as reading data from the register or writing data to the register. When the policy group 3 information 432 indicates that the fourth hardware component may not access the register, the fourth hardware component may not perform the transaction request 414.

Figure 6:
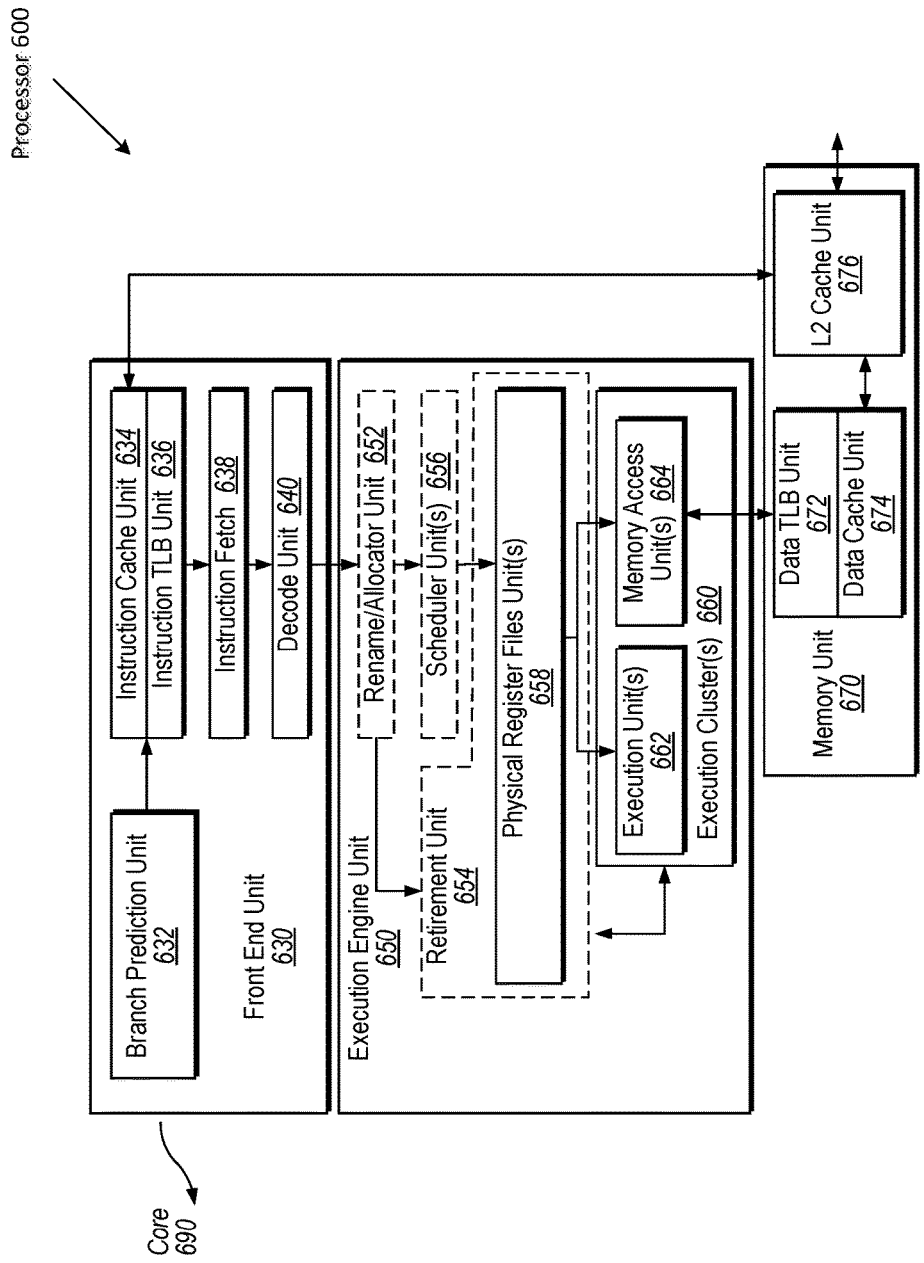
FIG. 6 is a block diagram illustrating a micro-architecture for a processor of FIG. 1, according to one embodiment.

FIG. 6 is a block diagram illustrating a micro-architecture for a processor 600 that implements the computing computer system 100 according to one embodiment. Specifically, processor 600 depicts an in-order architecture core and a register renaming logic, out-of-order issue/execution logic to be included in a processor according to at least one embodiment of the disclosure. The embodiments of the computing computer system 100 can be implemented in processor 600.

Processor 600 includes a front end unit 630 coupled to an execution engine unit 650, and both are coupled to a memory unit 670. The processor 600 may include a core 690 that is a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In another embodiment, the core 690 may have five stages.

The front end unit 630 includes a branch prediction unit 632 coupled to an instruction cache unit 634, which is coupled to an instruction translation lookaside buffer (TLB) unit 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670.

The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher, a data TLB unit 672, a data cache unit (DCU) 674, and a level 2 (L2) cache unit 676, to name a few examples. In some embodiments, DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to the main memory.

In one embodiment, the data prefetcher speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
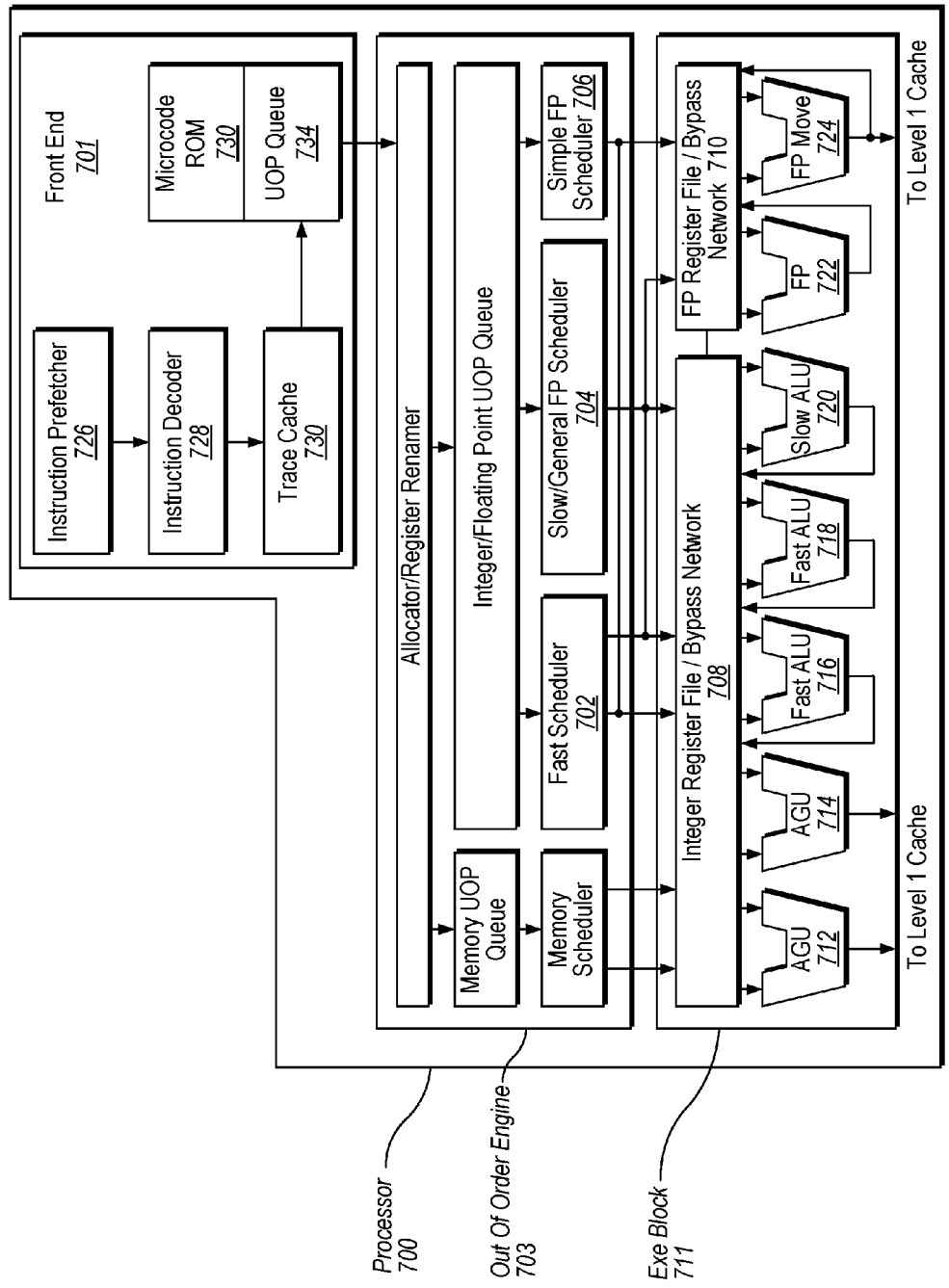
FIG. 7 illustrates a block diagram of the micro-architecture for a processor that includes logic circuits to perform access control, according to one embodiment.

FIG. 7 illustrates a block diagram of the micro-architecture for a processor 700 that includes logic circuits to perform access control according to one embodiment. In one embodiment, processor 700 is the processor 134 or 136 of FIG. 1.

In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The embodiments of the computing computer system 100 or 200 can be implemented in processor 700.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro-op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro-ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the micro-code, ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64-bit by 64-bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64-bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement access control according to one embodiment. In one embodiment, the execution block 711 of processor 700 may include PEL, to perform access control according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
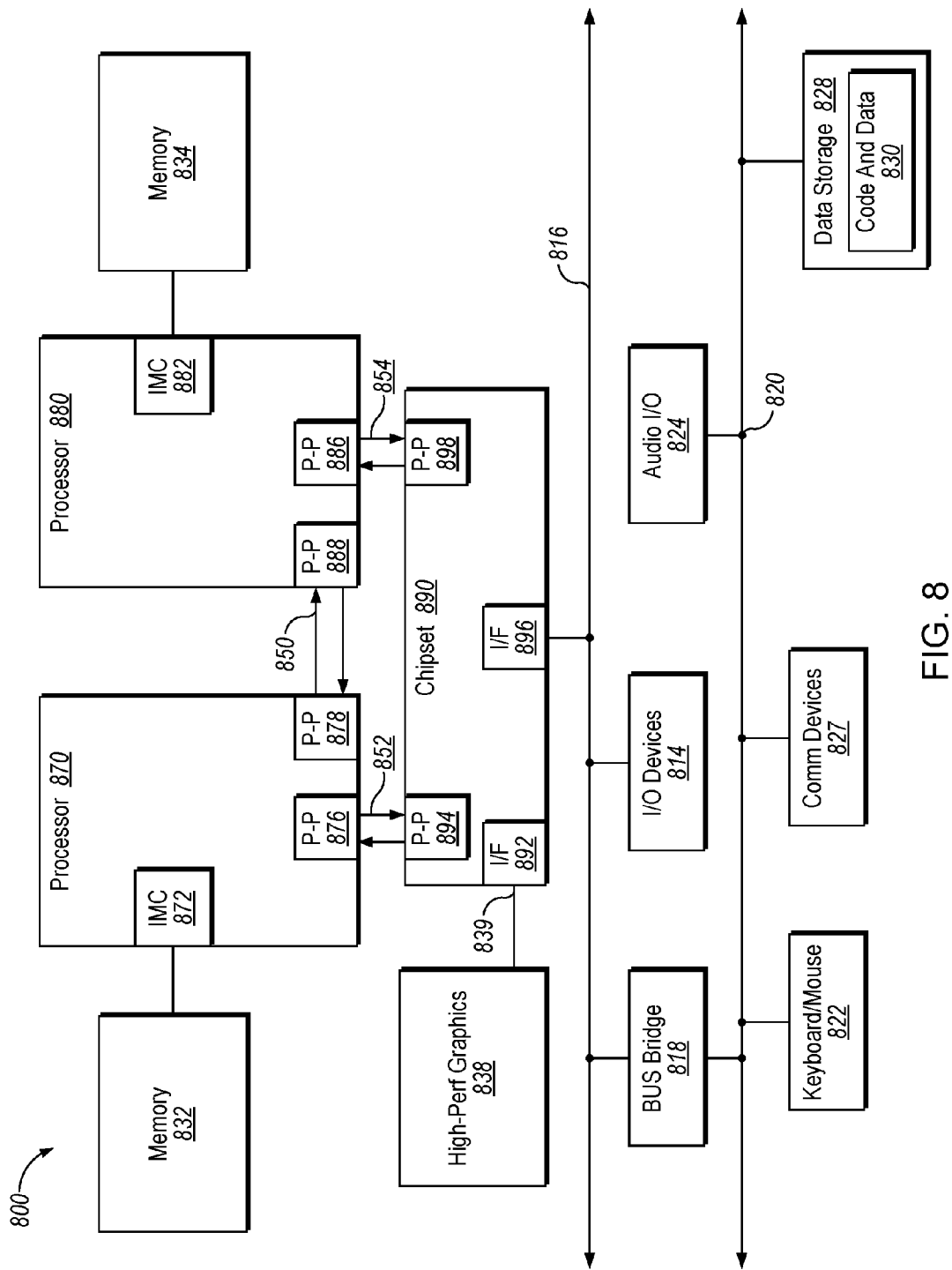
FIG. 8 is a block diagram of a computing system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874*a* and 874*b* and processor cores 884*a* and 884*b*), although potentially many more cores may be present in the processors. The processors each may include hybrid write mode logics in accordance with an embodiment of the present. The embodiments of the computing computer system 100 or 200 can be implemented in the processor 870, processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
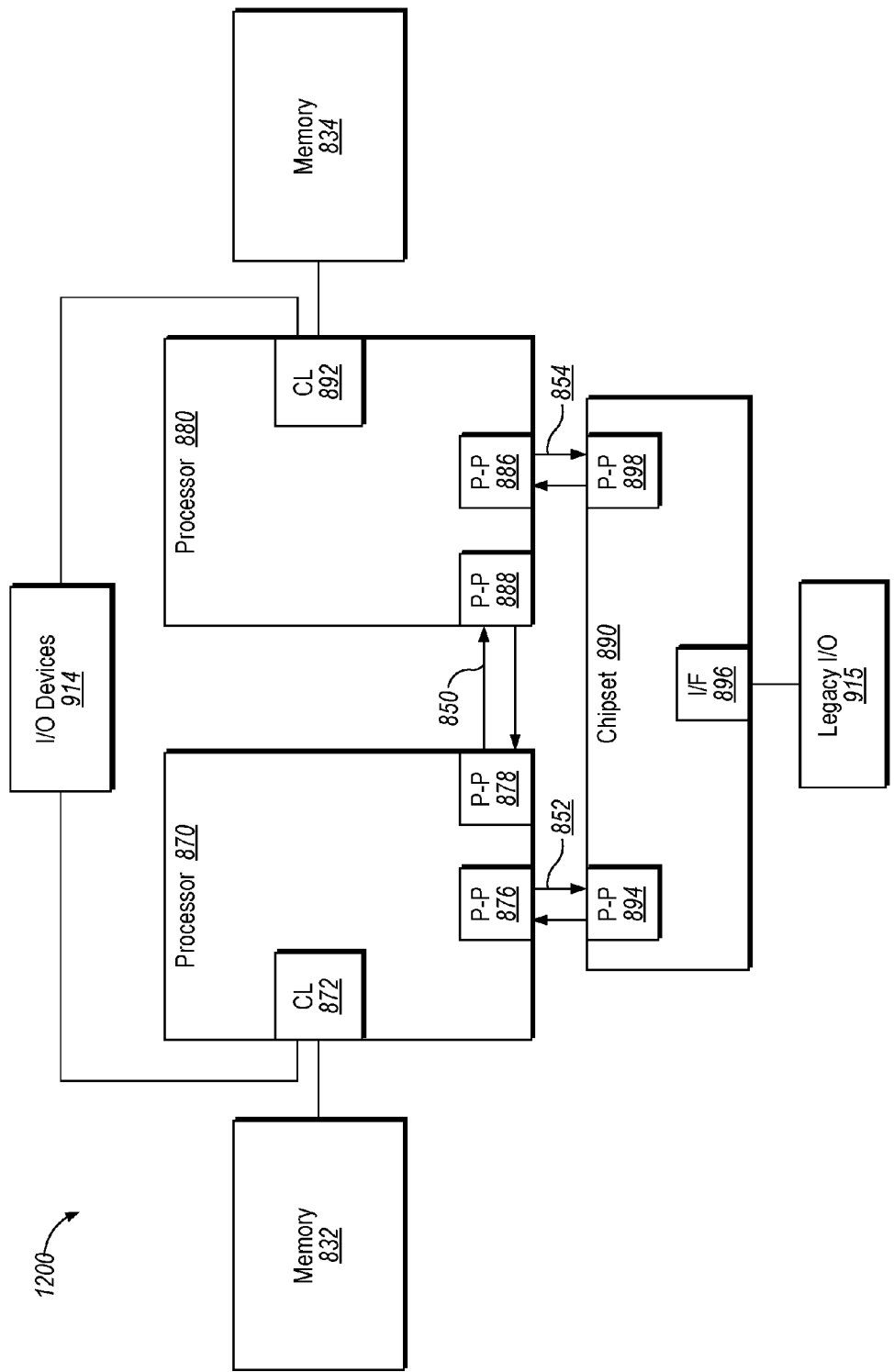
FIG. 9 is a block diagram of a computing system according to another implementation.

Referring now to FIG. 9, shown is a block diagram of a third system 900 in accordance with an embodiment of the present disclosure. Like elements in FIGS. 8 and 9 bear like reference numerals and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. For at least one embodiment, the CL 872, 882 may include integrated memory controller units such as described herein. In addition. CL 872, 882 may also include I/O control logic. FIG. 9 illustrates that the memories 832, 834 are coupled to the CL 872, 882, and that I/O devices 914 are also coupled to the control logic 872, 882. Legacy I/O devices 915 are coupled to the chipset 890. The embodiments of the computing computer system 100 or 200 can be implemented in processor 870, processor 880, or both.

Figure 10:
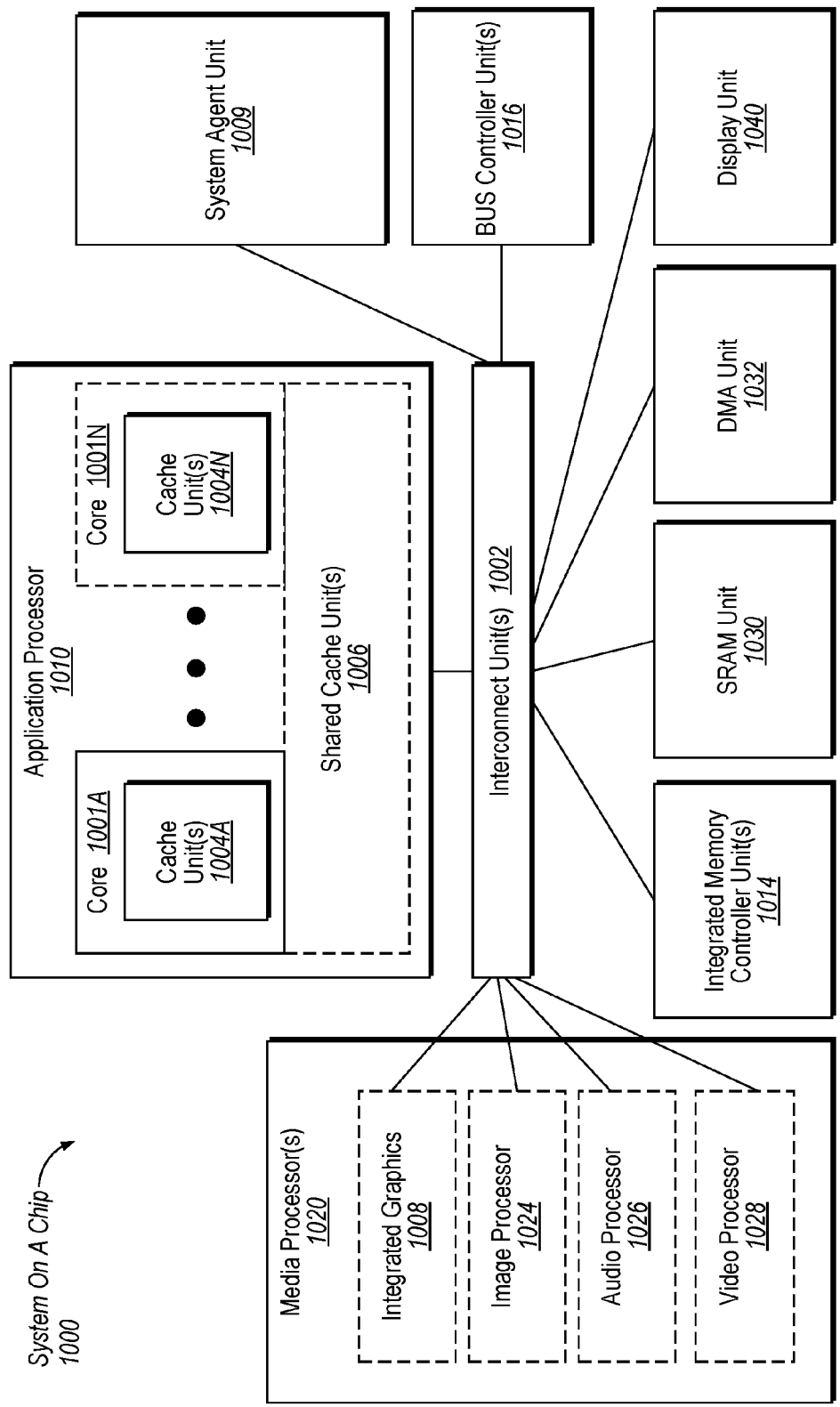
FIG. 10 is a block diagram of a system-on-a-chip according to one implementation.

FIG. 10 is an exemplary system on a chip (SoC) that may include one or more of the cores 1001. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Also, dashed lined boxes are features on more advanced SoCs. In FIG. 10, an interconnect unit(s) 1002 is coupled to: an application processor 1010 which includes a set of one or more cores 1001A-N and shared cache unit(s) 1006; a system agent unit 1009; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. The embodiments of the pages additions and content copying can be implemented in SoC 1000.

Figure 11:
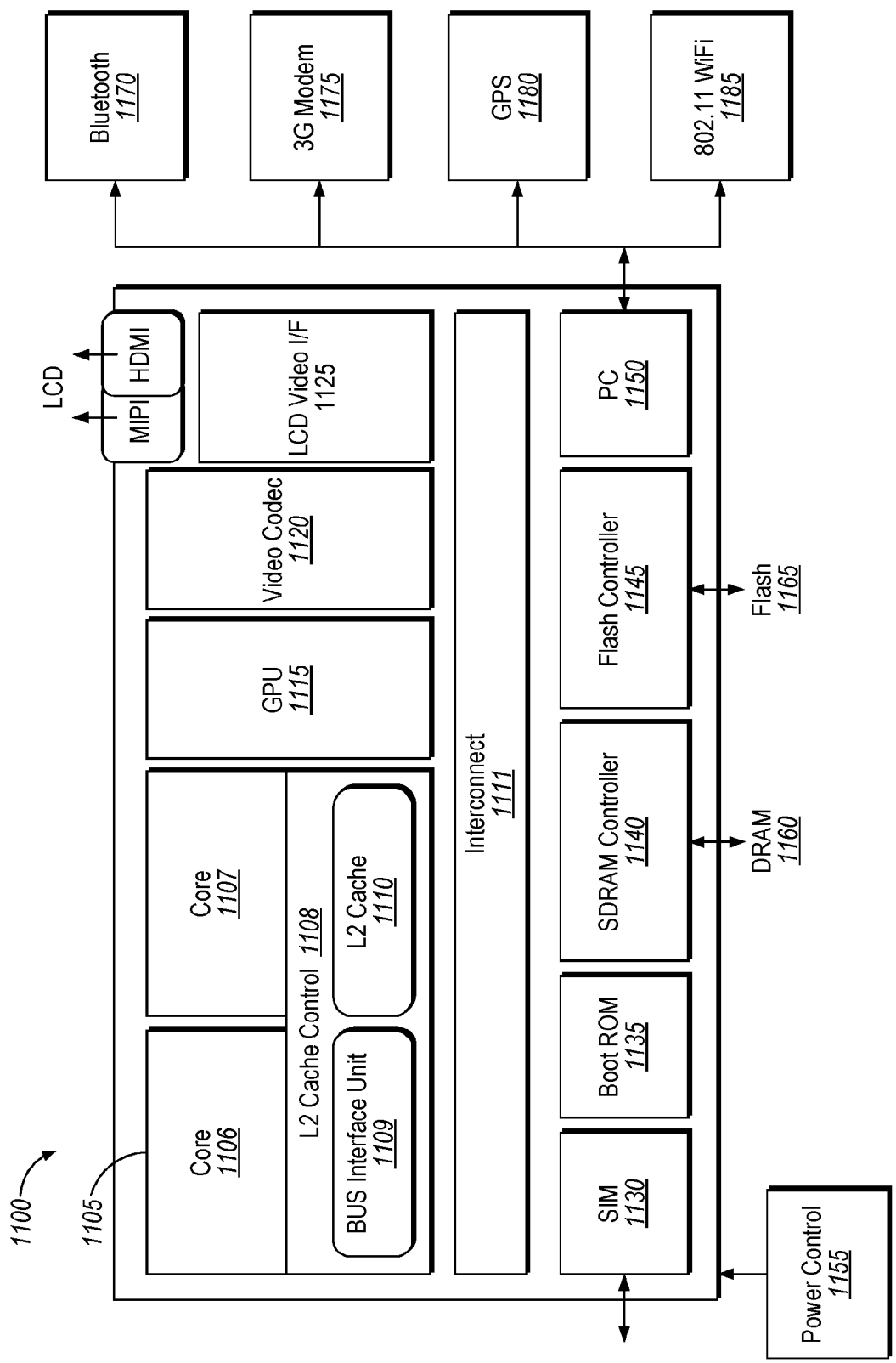
FIG. 11 illustrates another implementation of a block diagram of a computing system.

Turning next to FIG. 11, an embodiment of a system-on-a-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the computing computer system 100 or 200 can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, an MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch-enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
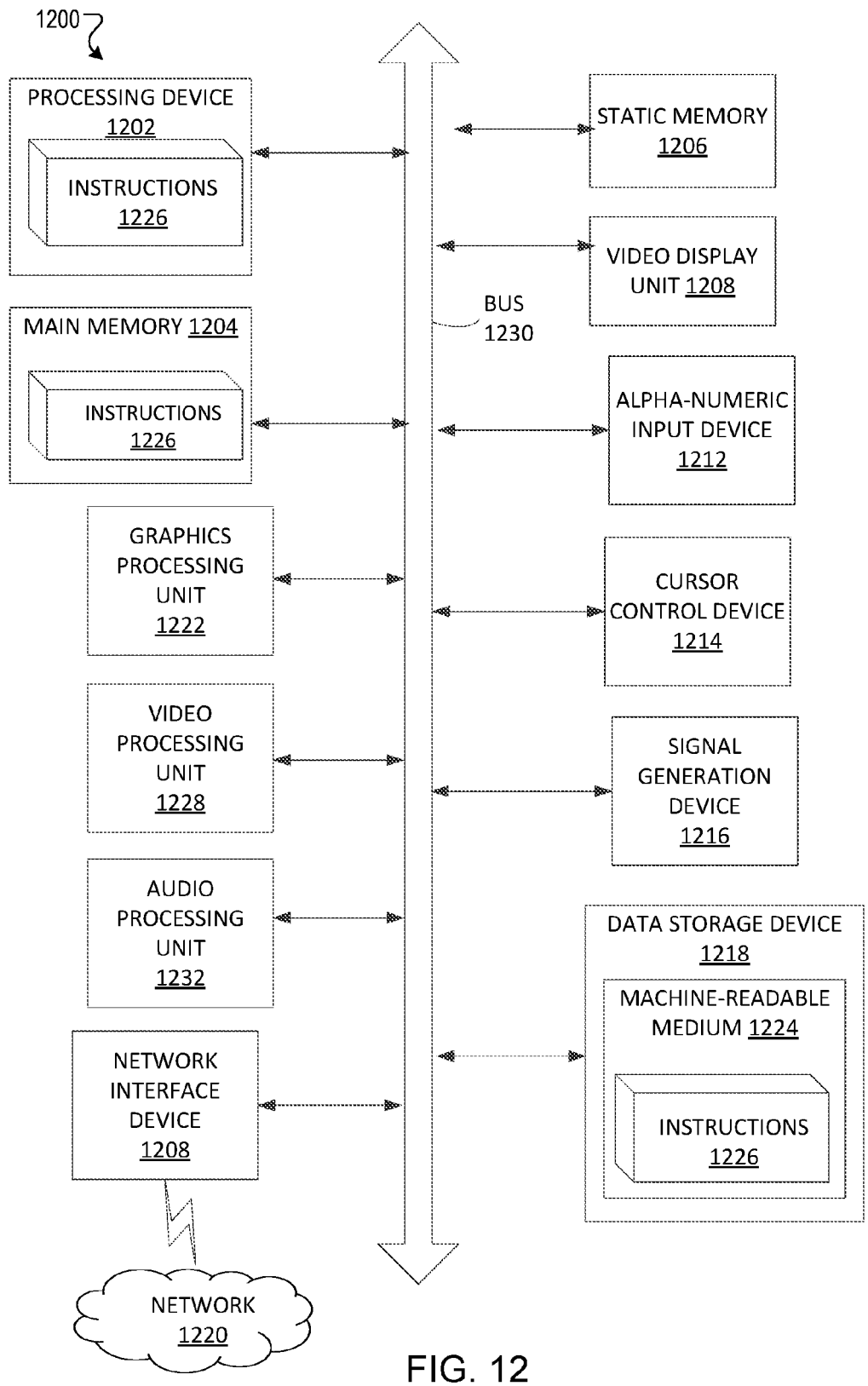
FIG. 12 illustrates another implementation of a block diagram of a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the computer system 100 can be implemented in computing system 1200.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field-programmable gate array (FPGA), a digital signal processor (DSP), network processor, or the like. In one embodiment, processing device 1202 may include one or processor cores. The processing device 1202 is configured to execute the instructions 1226 (e.g., processing logic) for performing the operations discussed herein. In one embodiment, processing device 1202 can include the processor 134 or 136 of FIG. 1. Alternatively, the computing system 1200 can include other components as described herein. It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored instructions 1226 (e.g., software) embodying any one or more of the methodologies of functions described herein. The instructions 1226 (e.g., software) may also reside, completely or at least partially, within the main memory 1204 as instructions 1226 and/or within the processing device 1202 as processing logic during execution thereof by the computing system 1200; the main memory 1204 and the processing device 1202 also constituting computer-readable storage media.

The computer-readable storage medium 1224 may also be used to store instructions 1226 utilizing the processing device 1202, such as the processor 134 or 136 described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a system on a chip (SoC) including: 1) a processor core; 2) a group of system registers; and 3) a secure access control mechanism to provide secure access control to the group of system registers based on a programmable security policy group, where: a) the secure access control mechanism comprises an array of universal control registers (UCRs), where a first value stored in a first entry of the array maps one of the group of system registers to a first access policy group; and b) the secure access control mechanism is to: i) receive a request to remap the one of the group of system registers from an association with the first access policy group to an association with a second access policy group, where the request comprises a remapping array to remap the one of the group system registers to a second access policy group; and ii) store the remapping array at a memory of the secure access control mechanism, wherein a first value stored in a first entry of the remapping array maps the one of the group of system registers to a second access policy group.

In Example 2, the SoC of Example 1, where the secure access control mechanism is to remap the one of the group of system registers from the association with the first access policy group to the association with the second access policy group using the remapping array.

In Example 3, the SoC of any one of Examples 1-2, where the second access policy group is associated with second access policy group information indicating an permission level of a device in the second access policy group to access one or more of the group of system registers.

In Example 4, the SoC of any one of Examples 1-3 where the second access policy group is a group of one or more hardware components, wherein the one or more hardware components have the same permission level to access the one or more system registers.

In Example 5, the SoC of any one of Examples 1-4, where the second access policy group is a group of hardware components that are the same type of hardware components.

In Example 6, the SoC of any one of Examples 1-5, wherein the secure access control mechanism is to: 1) receive a transaction request for a first hardware component to write data to register at a second hardware component, wherein the transaction request includes a first security attributes of initiator (SAI); 2) determine that the first SAI matches the first value stored in the first entry of the remapping array; and 3) provide the first hardware component access to write the data to the register at the second hardware component In Example 7, the SoC of any one of Examples 1-6, where the first hardware component is a device that initiates a resource access request to access a memory or register of the second hardware component.

In Example 8, the SoC of any one of Examples 1-7, where the first hardware component or the second hardware component is an input/output (I/O) controller, an inter-socket interface, a network interface card (NIC), a network bridge, a memory controller, a dynamic random-access memory DRAM, an accelerator, a memory, a cache, or another processor core.

In Example 9, the SoC of any one of Examples 1-8, where the first hardware component and the second hardware component are interconnected by an intra-socket fabric.

In Example 10, the SoC of any one of Examples 1-9, the first access policy group is an operating system (OS) policy group and the second access policy group is a microcode access policy group.

Various embodiments can have different combinations of the structural features described above. For instance, all optional features of the computing system described above can also be implemented with respect to the method or process described herein and specifics in the examples can be used anywhere in one or more embodiments.

Example 11 is a system on a chip (SoC) comprising: 1) a processor core; 2) a group of system registers; and 3) a processing device to provide secure access control to the group of system registers based on a programmable security policy group, where: a) the processing device comprises a bit field in each of the group of system registers; and b) where the bit field in one of the group of system registers comprises a first value indicating that the one register of the group of system registers belongs to a first access policy group; and 4) the processing device to: a) receive a request to change the one of the group of system registers from an association with the first access policy group to an association with a second access policy group; and b) in response to the request, change the first value to a second value indicating that the one register of the group of system registers belongs to a second access policy group.

In Example 12, the SoC of Example 11, where the bit field is a reconfigurable bit field.

In Example 13, the SoC of any one of Examples 11-12, wherein the processing device is to: 1) receive a transaction request for a first hardware component to write data to register at a second hardware component, wherein the transaction request includes a first security attributes of initiator (SAI); 2) determine that the first SAI matches the second value; and 3) provide the first hardware component access to write the data to the register at the second hardware component In Example 14, the SoC of any one of Examples 11-13, where the second access policy group is associated with second access policy group information indicating a permission level of a device in the second access policy group to access one or more of the group of system registers.

In Example 15, the SoC of any one of Examples 11-14, where the second access policy group is a group of one or more hardware components, wherein the one or more hardware components have the same permission level to access the one or more system registers.

Various embodiments can have different combinations of the structural features described above. For instance, all optional features of the computing system described above can also be implemented with respect to the method or process described herein and specifics in the examples can be used anywhere in one or more embodiments.

Example 16 is a method comprising: 1) receiving, by a secure access control mechanism, a request to remap one of a group of system registers from an association with a first access policy group to an association with a second access policy group, wherein the request comprises a remapping array to remap the one of the group system registers to the second access policy group; 2) storing the remapping array at a memory of the secure access control mechanism, wherein a first value stored in a first entry of the remapping array maps the one of the group of system registers to the second access policy group; and 3) remapping, by the secure access control mechanism, the one of a group of system registers from the association with the first access policy group to the association with the second access policy group using the remapping array In Example 17, the method of Example 16, where the second access policy group is a group of one or more hardware components, wherein the one or more hardware components have the same permission level to access the one or more system registers.

In Example 18, the method of any one of Examples 16-17, where the remapping of the one of a group of system registers from the association with the first access policy group to the association with the second access policy group occurs after the one or more hardware components has been integrated into a computer system.

In Example 19, the method of any one of Examples 16-18, further including: 1) receiving a transaction request for a first hardware component to write data to register at a second hardware component, wherein the transaction request includes a first security attributes of initiator (SAI); 2) determining that the first SAI matches a second SAI stored in first entry of the remapping array; and 3) providing the first hardware component access to write the data to the register at the second hardware component.

In Example 20, the method of any one of Examples 16-19, where the first access policy group is an operating system (OS) policy group and the second access policy group is a reserved access policy group.

Various embodiments may have different combinations of the structural features described above. For instance, all optional features of the computing system described above may also be implemented with respect to the method or process described herein and specifics in the examples may be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computing system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computing systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control, and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, a reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, wherein the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computing systems have been used. For example, the decimal number ten may also be represented as a binary value of 1010 and a hexadecimal letter A. Therefore, a value includes any representation of information capable of being held in a computing system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplary language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A system on a chip (SoC), comprising:
   a processor core;
   a group of system registers; and
   a secure access control mechanism to provide secure access control to the group of system registers based on a programmable security policy group, wherein:
   the secure access control mechanism comprises an array of universal control registers (UCRs), wherein a first value stored in a first entry of the array maps one of the group of system registers to a first access policy group, and
   the secure access control mechanism is to:
   receive a request to remap the one of the group of system registers from an association with the first access policy group to an association with a second access policy group, wherein the request comprises a remapping array to remap the one of the group system registers to the second access policy group;
   store the remapping array at a memory of the secure access control mechanism, wherein a first value stored in a first entry of the remapping array maps the one of the group of system registers to the second access policy group;
   receive a transaction request for a first hardware component to write data to a register at a second hardware component, wherein the transaction request includes a first security attributes of initiator (SAI);
   determine that the first SAI matches the first value stored in the first entry of the remapping array; and
   provide the first hardware component access to write the data to the register at the second hardware component.

2. The SoC of claim 1, wherein the secure access control mechanism is to remap the one of the group of system registers from the association with the first access policy group to the association with the second access policy group using the remapping array.

3. The SoC of claim 1, wherein the second access policy group is associated with second access policy group information indicating an permission level of a device in the second access policy group to access one or more of the group of system registers.

4. The SoC of claim 1, wherein the second access policy group is a group of one or more hardware components, wherein the one or more hardware components have the same permission level to access the one or more system registers.

5. The SoC of claim 1, wherein the second access policy group is a group of hardware components that are the same type of hardware components.

6. The SoC of claim 1, wherein the first hardware component is a device that initiates a resource access request to access a memory or register of the second hardware component.

7. The SoC of claim 1, wherein the first hardware component or the second hardware component is an input/output (I/O) controller, an inter-socket interface, a network interface card (NIC), a network bridge, a memory controller, a dynamic random-access memory DRAM, an accelerator, a memory, a cache, or another processor core.

8. The SoC of claim 1, wherein the first hardware component and the second hardware component are interconnected by an intra-socket fabric.

9. The SoC of claim 1, wherein the first access policy group is an operating system (OS) policy group and the second access policy group is a microcode access policy group.

10. A system on a chip (SoC), comprising:
a processor core;
a group of system registers;
a processing device to provide secure access control to the group of system registers based on a programmable security policy group, wherein:
the processing device comprises a bit field in each of the group of system registers, wherein the bit field in one register of the group of system registers comprises a first value indicating that the one register of the group of system registers belongs to a first access policy group, and
the processing device to:
receive a request to change the one register of the group of system registers from an association with the first access policy group to an association with a second access policy group;
in response to the request, change the first value to a second value indicating that the one register of the group of system registers belongs to the second access policy group
receive a transaction request for a first hardware component to write data to a register at a second hardware component, wherein the transaction request includes a first security attributes of initiator (SAI);
determine that the first SAI matches the second value; and
provide the first hardware component access to write the data to the register at the second hardware component.

11. The SoC of claim 10, wherein the bit field is a reconfigurable bit field.

12. The SoC of claim 10, wherein the second access policy group is associated with second access policy group information indicating a permission level of a device in the second access policy group to access one or more of the group of system registers.

13. The SoC of claim 10, wherein the second access policy group is a group of one or more hardware components, wherein the one or more hardware components have the same permission level to access the one or more system registers.

14. A method, comprising:
receiving, by a secure access control mechanism, a request to remap one of a group of system registers from an association with a first access policy group to an association with a second access policy group, wherein the request comprises a remapping array to remap the one of the group system registers to the second access policy group;
storing the remapping array at a memory of the secure access control mechanism, wherein a first value stored in a first entry of the remapping array maps the one of the group of system registers to the second access policy group; and
remapping, by the secure access control mechanism, the one of a group of system registers from the association with the first access policy group to the association with the second access policy group using the remapping array.

15. The method of claim 14, wherein the second access policy group is a group of one or more hardware components, wherein the one or more hardware components have the same permission level to access the one or more system registers.

16. The method of claim 15, wherein the remapping of the one of a group of system registers from the association with the first access policy group to the association with the second access policy group occurs after the one or more hardware components has been integrated into a computer system.

17. The method of claim 15, further comprising:
receiving a transaction request for a first hardware component to write data to register at a second hardware component, wherein the transaction request includes a first security attributes of initiator (SAI);
determining that the first SAI matches a second SAI stored in first entry of the remapping array; and
providing the first hardware component access to write the data to the register at the second hardware component.

18. The method of claim 14, wherein the first access policy group is an operating system (OS) policy group and the second access policy group is a reserved access policy group.

* * * * *